(12) United States Patent
Lee et al.

(10) Patent No.: US 10,600,205 B2
(45) Date of Patent: Mar. 24, 2020

(54) ANCHOR RECOGNITION IN REALITY SYSTEM

(71) Applicant: HTC Corporation, Taoyuan (TW)

(72) Inventors: Hsin-Hao Lee, Taoyuan (TW);
Chia-Chu Ho, Taoyuan (TW);
Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 76 days.

(21) Appl. No.: 15/863,994

(22) Filed: Jan. 8, 2018

(65) Prior Publication Data
US 2019/0213754 A1   Jul. 11, 2019

(51) Int. Cl.
| | | |
|---|---|---|
| G06K 9/00 | (2006.01) | |
| G06T 7/73 | (2017.01) | |
| G06K 9/78 | (2006.01) | |
| G06K 9/03 | (2006.01) | |
| G06K 9/62 | (2006.01) | |
| G06T 7/60 | (2017.01) | |
| G06K 9/46 | (2006.01) | |

(52) U.S. Cl.
CPC ............ *G06T 7/74* (2017.01); *G06K 9/00671* (2013.01); *G06K 9/03* (2013.01); *G06K 9/46* (2013.01); *G06K 9/6202* (2013.01); *G06K 9/6211* (2013.01); *G06K 9/78* (2013.01); *G06T 7/60* (2013.01)

(58) Field of Classification Search
CPC .......... G06K 9/03; G06K 9/46; G06K 9/6202; G06K 9/78; G06T 7/60; G06T 7/74
See application file for complete search history.

(56) References Cited

U.S. PATENT DOCUMENTS

| | | | |
|---|---|---|---|
| 2015/0220776 A1* | 8/2015 | Cronholm | G06F 3/017 382/103 |
| 2016/0027215 A1 | 1/2016 | Burns et al. | |
| 2016/0109937 A1* | 4/2016 | Kim | G06F 1/163 345/156 |
| 2017/0061694 A1 | 3/2017 | Giraldi et al. | |
| 2018/0033206 A1* | 2/2018 | Han | G06T 7/74 |

(Continued)

FOREIGN PATENT DOCUMENTS

| | | |
|---|---|---|
| CN | 103562968 A | 2/2014 |
| CN | 104919518 A | 9/2015 |
| CN | 106997281 A | 8/2017 |

(Continued)

OTHER PUBLICATIONS

Corresponding Taiwan office action dated Sep. 26, 2019.

*Primary Examiner* — Xin Jia
(74) *Attorney, Agent, or Firm* — CKC & Partners Co., LLC

(57) ABSTRACT

A control method, suitable for head-mounted devices located in a physical environment, includes following operations. Images of the physical environment are captured over time by the head-mounted devices. Candidate objects and object features of the candidate objects are extracted from the images. Local determinations are generated about whether each of the candidate objects is fixed or not. The object features and the local determinations are shared between the head-mounted devices. An updated determination is generated about whether each of the candidate objects is fixed or not according to the local determinations shared between the head-mounted devices.

10 Claims, 10 Drawing Sheets

(56) References Cited

U.S. PATENT DOCUMENTS

2019/0114802 A1* 4/2019 Lazarow .................. G06T 7/74

FOREIGN PATENT DOCUMENTS

| CN | 107024995 A | 8/2017 |
|---|---|---|
| CN | 107145223 A | 9/2017 |
| CN | 206819290 U | 12/2017 |
| TW | 201633104 A | 9/2016 |

* cited by examiner

ANCHOR RECOGNITION IN REALITY SYSTEM

BACKGROUND

Field of Invention

The disclosure relates to a reality system. More particularly, the disclosure relates to how to recognize anchor points in a reality system.

Description of Related Art

Virtual Reality (VR), Augmented Reality (AR), Substitutional Reality (SR), and/or Mixed Reality (MR) devices are developed to provide immersive experiences to users. When a user wearing a head-mounted device, the visions of the user will be covered by the immersive content shown on the head-mounted device. The immersive content shows a scenario of a specific space.

These reality systems usually equip a tracking component to locate users wearing the head-mounted device, so as to acknowledge a location or a movement of the user in the real world. The immersive content displayed on the head-mounted device will vary according to the location or the movement of the user, such that the user may have a better experience in the VR, AR, SR or MR scenario.

SUMMARY

The disclosure provides a reality system including a first head-mounted device. The first head-mounted device is located in a physical environment. The first head-mounted device includes a camera unit, a communication unit and a processor. The camera unit is configured for capturing images of the physical environment over time. The communication unit is configured for communicating with second head-mounted devices. The processor is coupled to the camera unit and the communication unit. The processor is configured to: extract first candidate objects and first object features of the first candidate objects from the images captured by the camera unit; generate a first local determination about whether each of the first candidate objects is fixed or not; transmit the first object features and the first local determination to the second head-mounted devices; receive second object features of second candidate objects and second local determinations about whether each of the second candidate objects is fixed or not from the second head-mounted devices; and generate an updated determination about whether each of the first candidate objects is fixed or not according to the first local determination and the second local determinations.

The disclosure also provides a reality system including head-mounted devices and a server device. The head-mounted devices are located in a physical environment. Each of the head-mounted devices is configured to extract candidate objects, extract object features of the candidate objects and generate local determinations about whether each of the candidate objects is fixed or not in view of each of the head-mounted devices. The server device is communicated with the head-mounted devices, wherein the server device is configured to: collect the object features of the candidate objects and the local determinations from the head-mounted devices; generate an updated determination about whether each of the candidate objects is fixed or not according to the local determinations collected from the head-mounted devices; and, transmit the updated determination to each of the head-mounted devices.

The disclosure also provides a control method suitable for head-mounted devices located in a physical environment. The control method includes following operations. Images of the physical environment are captured over time by the head-mounted devices. Candidate objects and object features of the candidate objects are extracted from the images. Local determinations are generated about whether each of the candidate objects is fixed or not. The object features and the local determinations are shared between the head-mounted devices. An updated determination is generated about whether each of the candidate objects is fixed or not according to the local determinations shared between the head-mounted devices.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
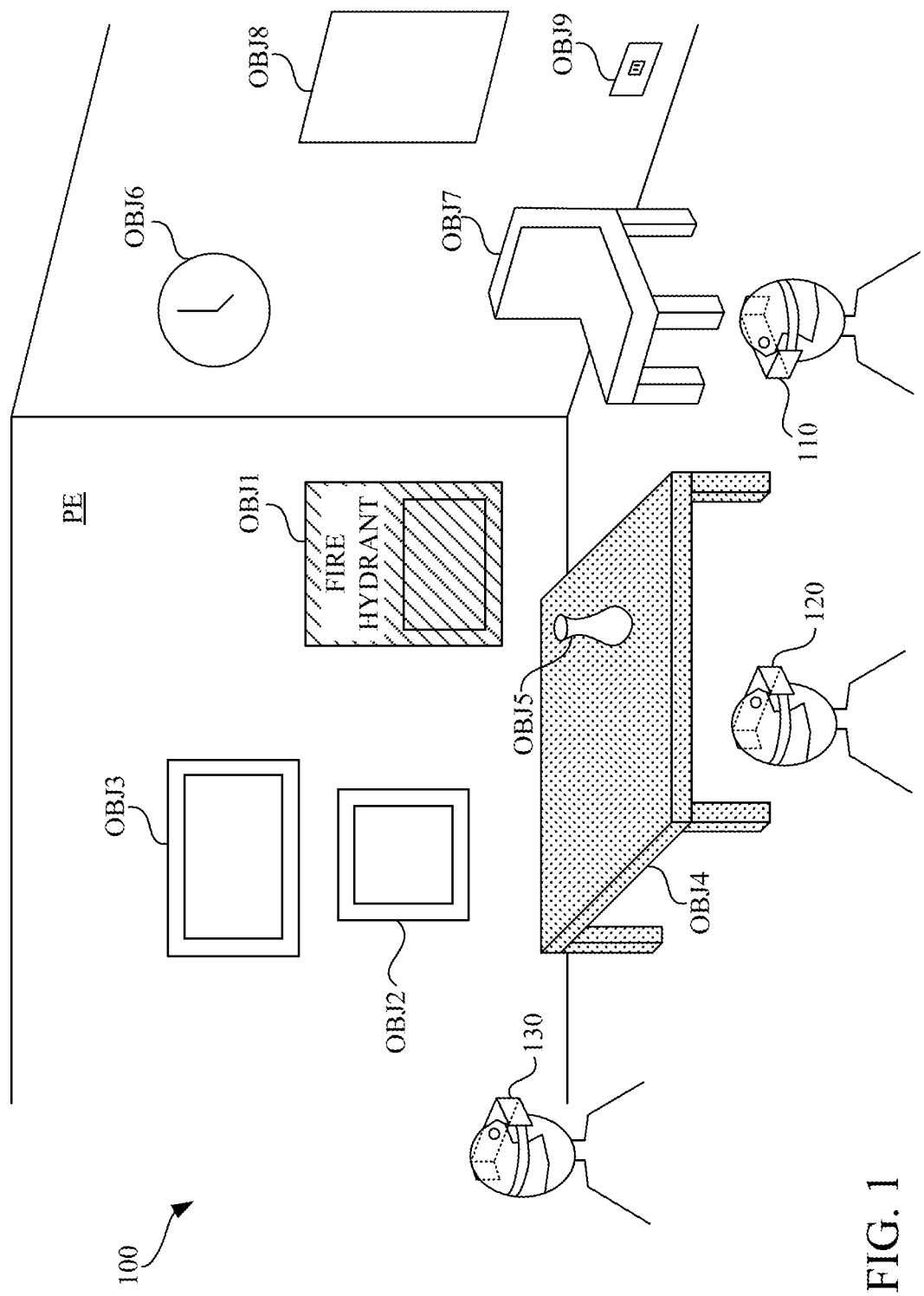
FIG. 1 is a schematic diagram illustrating a reality system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a reality system 100 according to an embodiment of this disclosure. The reality system 100 includes at least one head-mounted device located in a physical environment PE. In the embodiment shown in FIG. 1, the reality system 100 includes three head-mounted devices 110, 120 and 130, which are mounted on heads of different users in the physical environment PE. However, the disclosure is not limited to three head-mounted devices as shown in FIG. 1. The reality system 100 may include two or more head-mounted devices. These users may locate at different positions and face toward various directions in the physical environment PE.

The reality system 100 is one of a Virtual Reality (VR), an Augmented Reality (AR), a Substitutional Reality (SR), or a Mixed Reality (MR) system. In order to provide an immersive experience to the users, the head-mounted devices 110, 120 and 130 are configured to construct a map of the physical environment PE and sense relative locations of the head-mounted devices 110, 120 and 130 in the physical environment PE. In some embodiments, Simultaneous Localization and Mapping (SLAM) technology is utilized by the reality system 100 to construct the map of an unknown environment (e.g., the physical environment PE) while simultaneously tracking the head-mounted devices 110, 120 and 130 within the unknown environment.

As shown in FIG. 1, there are some candidate objects OBJ1-OBJ9 located at different positions in the physical environment PE. The map of the physical environment PE can be constructed by observing the physical environment PE with some sensors on the head-mounted devices 110, 120 and 130. On the other hand, the relative locations of the head-mounted devices 110, 120 and 130 in the physical environment PE can be sensed by calculating distances between one head-mounted device and reference points in the physical environment PE. While locating the head-mounted devices 110, 120 and 130 in the physical environment PE, finding the valid reference points is important. In an ideal case, the reference points utilized to locate the head-mounted devices 110, 120 and 130 in a locating algorithm should be fixed at same positions over time. Since the reference points are fixed at the same positions in the physical environment PE, the locations of the head-mounted devices 110, 120 and 130 can be generated by measuring relative distances between the head-mounted devices 110, 120 and 130 and the reference points. If the reference points are moved for some reasons, the locating results generated by the locating algorithm will be shifted and include errors. In this case, visions displayed to the users wearing the head-mounted devices 110, 120 and 130 will change dramatically and inconsistently. In some embodiments of this disclosure, the reality system 100 is able to extinguish fixed objects from the candidate objects OBJ1-OBJ9 in the physical environment PE.

Figure 2:
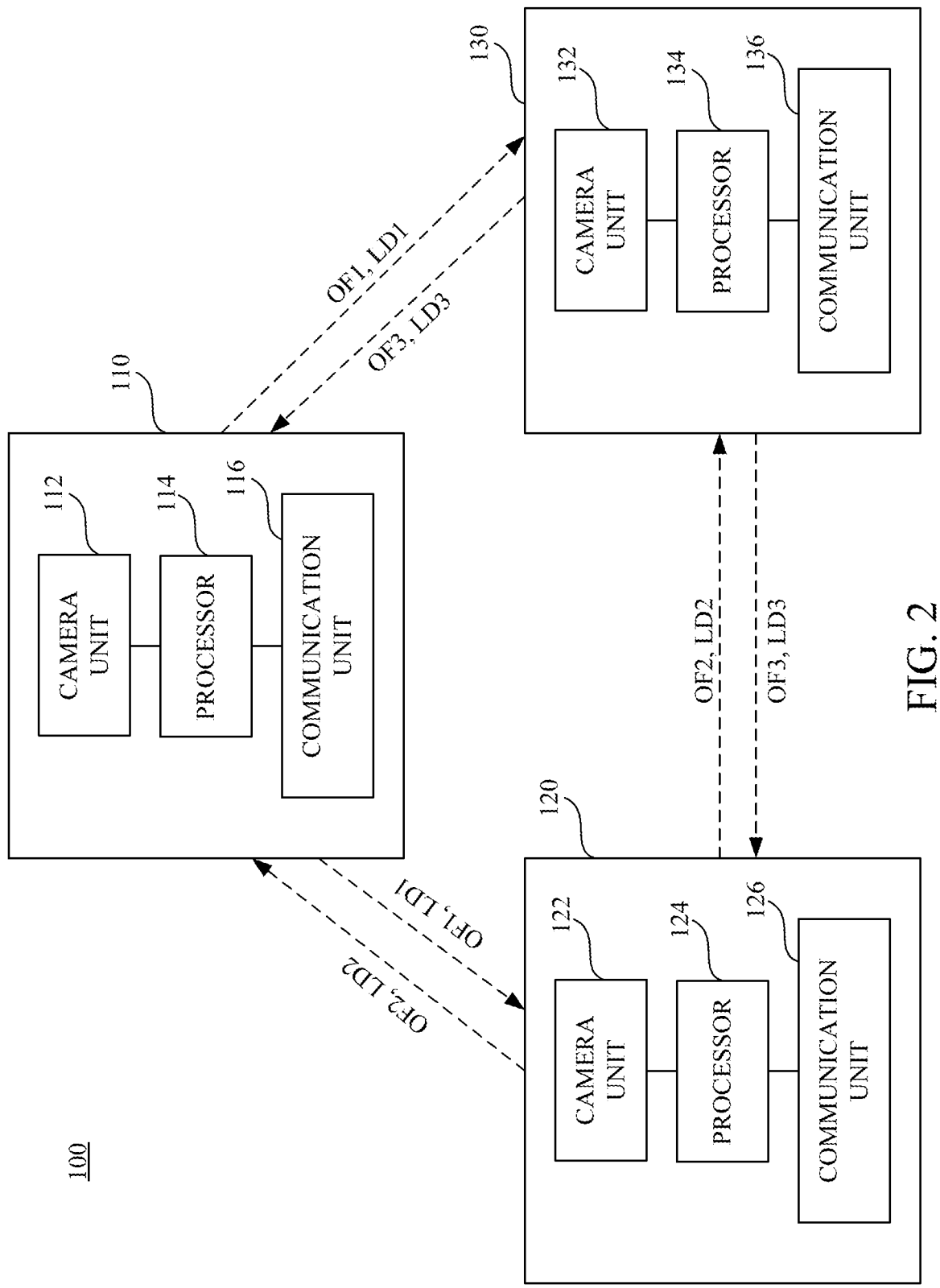
FIG. 2 is a functional block diagram illustrating the reality system in FIG. 1 according to an embodiment of the disclosure.

Reference is further made to FIG. 2, which is a functional block diagram illustrating the reality system 100 in FIG. 1 according to an embodiment of the disclosure. As shown in FIG. 2, the head-mounted device 110 includes a camera unit 112, a processor 114 and a communication unit 116. The camera unit 112 is configured for capturing images of the physical environment PE over time. In some embodiments, the camera unit 112 can include one camera component located at the front side of the head-mounted device 110. In some other embodiments, the camera unit 112 can include a dual camera module and/or a depth camera. The communication unit 116 of the head-mounted device 110 is configured for communicating with other head-mounted devices 120 and 130. In an embodiment, the communication unit 116 can include a WiFi transceiver, a WiFi-Direct transceiver, a Bluetooth transceiver, a BLE transceiver, a Zigbee transceiver and/or any equivalent wireless communication transceiver. In another embodiment, the communication unit 116 can include a wire connector (e.g., a USB connector, an Ethernet connector) for communication. The processor 114 is coupled to the camera unit 112 and the communication unit 116. The processor 114 can be a central processing unit, a graphic processing unit and/or a control integrated circuit on the head-mounted device 110.

Similarly, the head-mounted device 120 includes a camera unit 122, a processor 124 and a communication unit 126, and the head-mounted device 130 includes a camera unit 132, a processor 134 and a communication unit 136. Each of the head-mounted devices 110, 120 and 130 includes similar components and these components are configured to perform similar functions. For brevity reasons, the following embodiments will demonstrate details of features on the head-mounted device 110. The head-mounted device 120 or 130 also includes corresponding details of features respectively.

Figure 3:
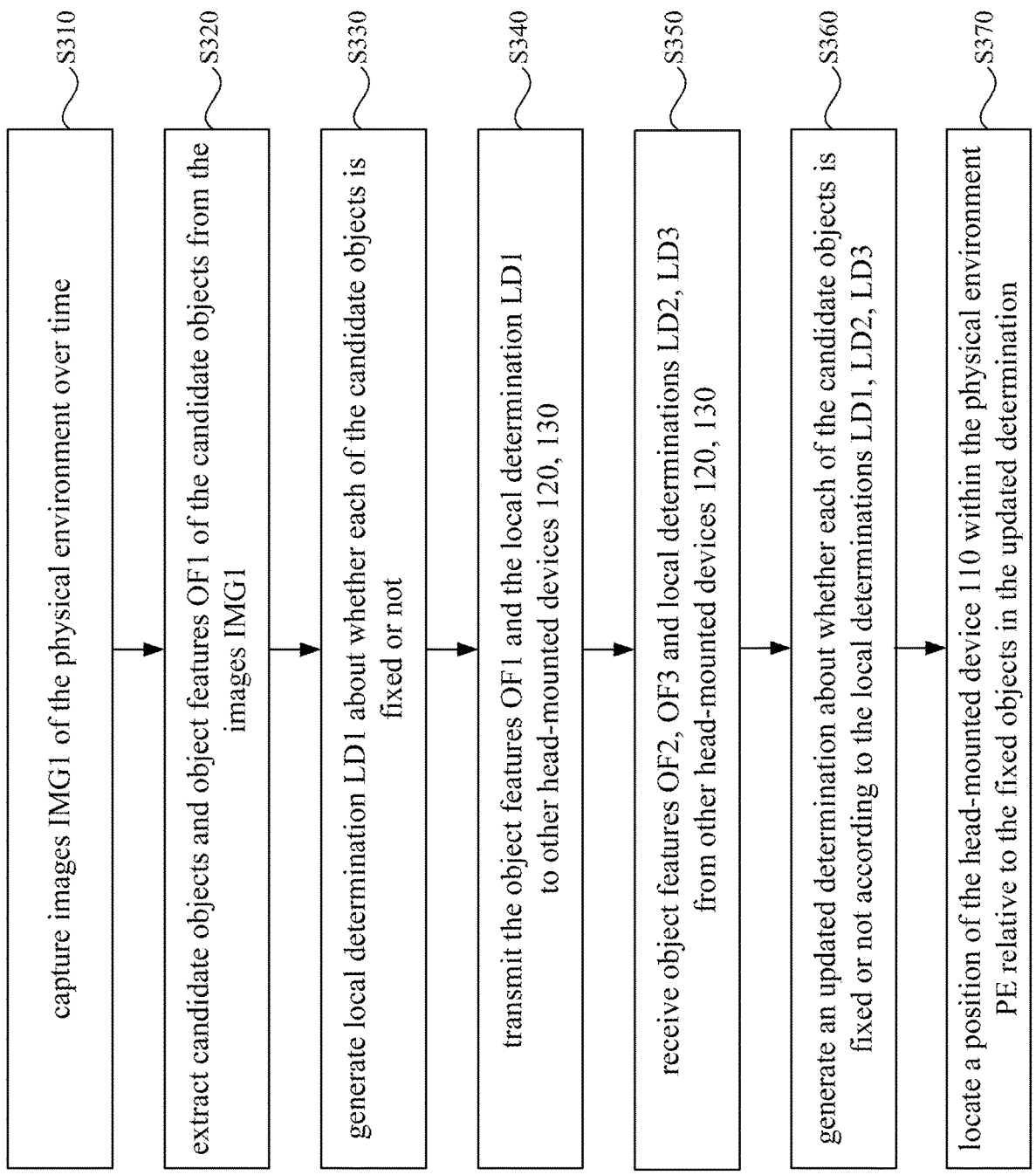
FIG. 3 is a flow diagram illustrating a control method suitable to be utilized on the head-mounted device in FIG. 1 and FIG. 2.
Figure 4A:
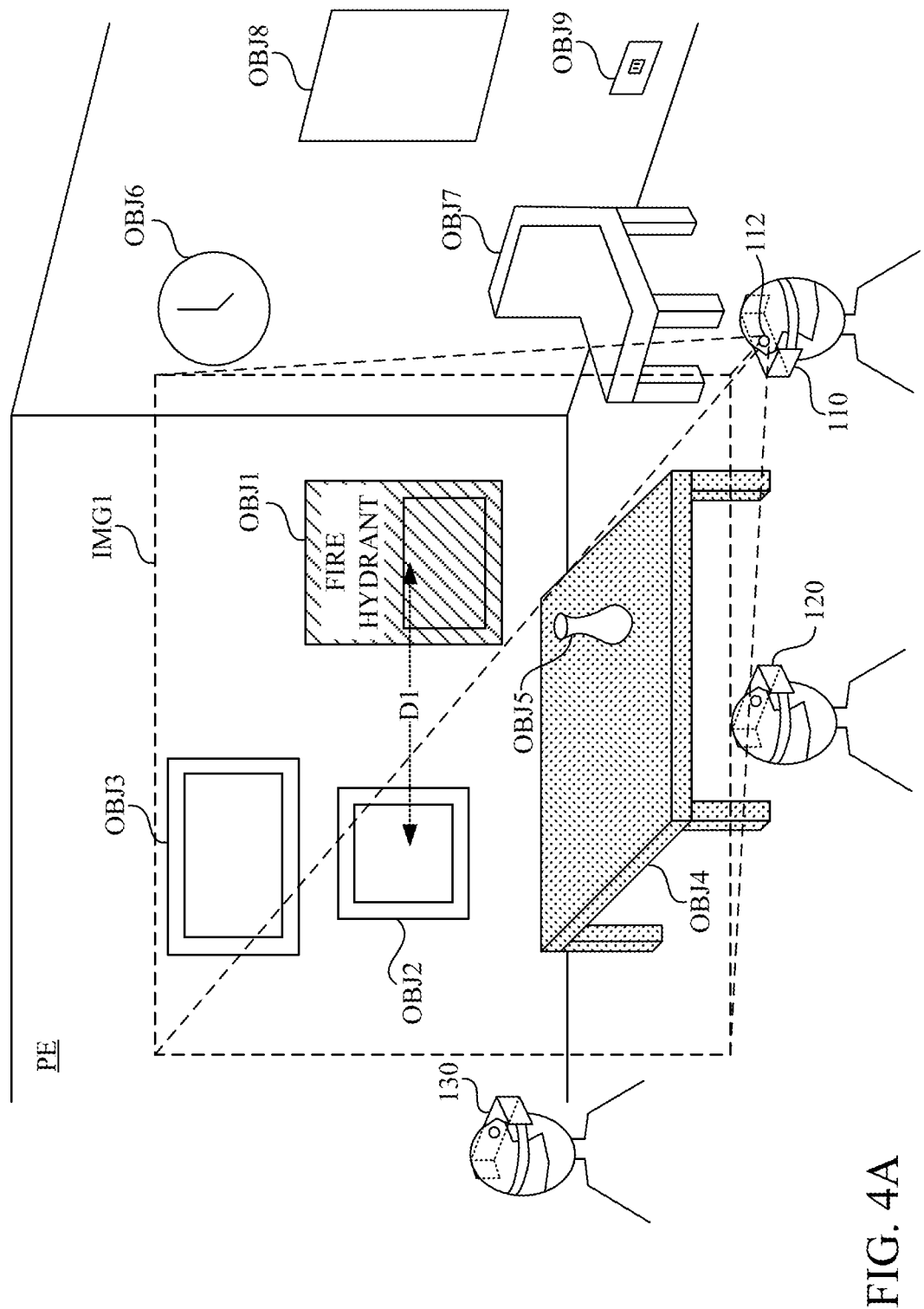
FIG. 4A to FIG. 4C are schematic diagrams illustrating views of different head-mounted devices in the physical environment.

Reference is further made to FIG. 3 and FIG. 4A. FIG. 3 is a flow diagram illustrating a control method 300 suitable to be utilized on the head-mounted device 110 in FIG. 1 and FIG. 2. FIG. 4A is a schematic diagram illustrating the head-mounted device 110 in the physical environment PE.

As shown in FIG. 2, FIG. 3 and FIG. 4A, operation S310 of the control method 300 is performed to capture images IMG1 of the physical environment PE over time by the camera unit 112. In some embodiments, the camera unit 112 is configured to capture images IMG1 of the physical environment PE periodically (e.g., every 10 microseconds or every 100 microseconds). The images IMG1 are sequential images to reflect a partial view of the physical environment PE in front of the head-mounted device 110. The partial view corresponds to a field of view (FOV) of the camera unit 112. In some embodiments, the FOV of the camera unit 112 is unable to cover the whole scene of the physical environment PE. In some embodiments, images IMG1 captured by the camera unit 112 are utilized by the processor 114 to construct a partial map of the physical environment PE and locate the head-mounted device 110.

Operation S320 is performed by the processor 114 to extract candidate objects from the images IMG1 captured by the camera unit 112 and also extract object features OF1 of the candidate objects from the images IMG1. As shown in FIG. 4A, the images IMG1 covers the candidate objects OBJ1-OBJ5. Therefore, the processor is able to extract the candidate objects OBJ1-OBJ5 and the object features OF1 of the candidate objects OBJ1-OBJ5 from the images IMG1. In some embodiments, the object features OF1 include at least one of colors, sizes and shapes of the candidate objects OBJ1-OBJ5. Operation S330 is performed by the processor 114 to generate a local determination LD1 about whether each of the candidate objects OBJ1-OBJ5 is fixed or not. An example of the object features OF1 and the local determination LD1 generated by the processor 114 is listed in the following Table 1:

TABLE 1

| | OF1 | | | LD1 |
|---|---|---|---|---|
| | color | size | shape | fixed or not |
| item1 (OBJ1) | red | 40 cm * 50 cm | rectangle | Y |
| item2 (OBJ4) | brown | 95 cm * 60 cm | horizontal plane with supporters | N |
| item3 (OBJ2) | black | 30 cm * 30 cm | square | Y |
| item4 (OBJ3) | yellow | 50 cm * 35 cm | rectangle | Y |
| item5 (OBJ5) | blue | 8 cm * 15 cm | concave cylinder | Y |

The local determination LD1 can be generated by the processor 114 according to local information (e.g., the images IMG1 captured by the camera unit 112 and/or the object features OF1 of the candidate objects OBJ1-OBJ5).

In an embodiment, the local determination LD1 is generated by the processor 114 based on an object recognition algorithm. For example, the processor 114 recognizes the item1 in Table 1 (corresponding to the candidate object OBJ1 in FIG. 4A) as a fire hydrant based on the red color and the rectangle shape. The processor 114 may recognize the item2 (corresponding to the candidate object OBJ4 in FIG. 4A) as a table based on the brown color and the shape of a horizontal plane with supporters. Similarly, the processor 114 may further recognize the item3 (corresponding to the candidate object OBJ2) as a picture frame based on the size and the shape. The processor 114 recognize the item4 (corresponding to the candidate object OBJ3 as another picture frame. The processor 114 recognize the item5 (corresponding to the candidate object OBJ5 as a vase based on the size and the shape. Based on aforesaid object recognition results, the processor 114 can determine whether the items in Table 1 are fixed or not. In the embodiment, the item1, the item3 and the item4 (i.e., candidate objects OBJ1, OBJ2 and OBJ3 shown in FIG.) are determined to be fixed locally by the processor 114 on the head-mounted device 110. In some cases, the fixed items can be regarded as anchor points in the physical environment PE for locating the head-mounted device 110. However, the head-mounted device 110 is only capable to observe the partial map of the physical environment PE from one vision point, such that it is hard to ensure the correctness of the local determination LD1.

For example, the item5 corresponding to the candidate object OBJ5 is a vase, which can be movable over time, such that the candidate object OBJ5 is not suitable to be regarded as an anchor point for locating function. In this case, the local information LD1 based on limited information (only observing the candidate object OBJ5 for 3 seconds from one vision point) may determine the candidate object OBJ5 to be fixed by mistake.

In addition, once the user move to some other positions or faces toward different directions, the item 1, the item3 and the item4 (e.g., the candidate objects OBJ1, OBJ2 and OBJ3) may not appear in the field of view of the camera unit 112. The head-mounted device 110 will not able to locate itself until new anchor points are found.

As shown in FIG. 2 and FIG. 3, operation S340 is performed by the processor 114 to transmit the object features OF1 and the local determination LD1 (i.e., as shown in Table 1) through the communication unit 116 to other head-mounted devices 120 and 130. Operation S350 is performed by the processor 114 to receive object features OF2 and local determination LD2 from the head-mounted devices 120 and receive object features OF3 and local determination LD3 from the head-mounted devices 130.

Figure 4B:
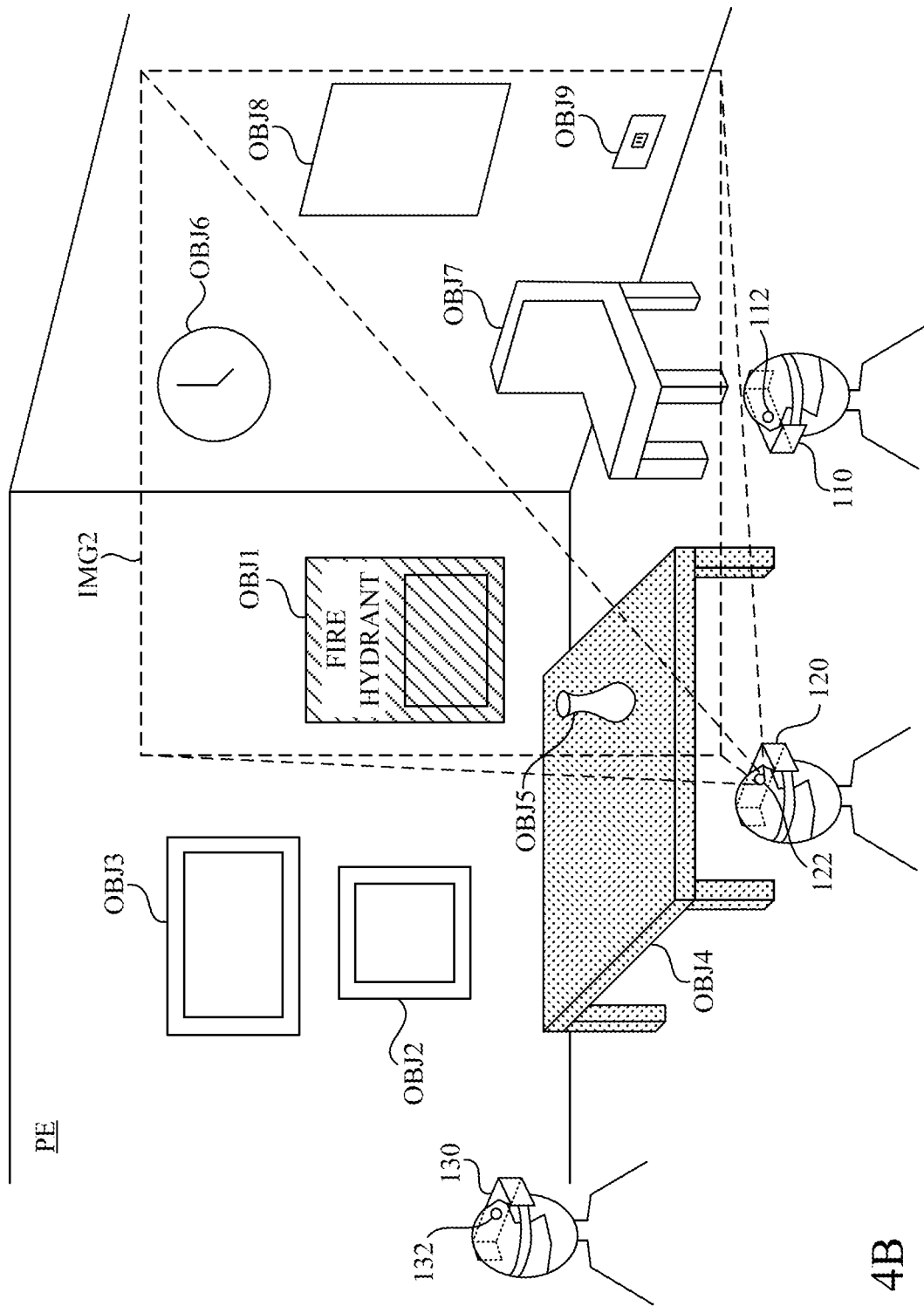

Reference is further made to FIG. 4B, which is a schematic diagram illustrating the head-mounted device 120 in the physical environment PE. Similar to operations S310-S330 in aforesaid embodiments, the head-mounted devices 120 is able to capture images IMG2 as shown in FIG. 4B of the physical environment over time. The images IMG2 captured by the camera unit 122 of the head-mounted device 120 may be different from the images IMG1 because the head-mounted device 120 is located at different position from the head-mounted devices 110.

In this embodiment shown in FIG. 4B, the images IMG2 covers another partial view of the physical environment PE. The image IMG2 covers candidate objects OBJ1, OBJ5, OBJ6, OBJ7, OBJ8 and OBJ9. Similarly, the processor 124 will extract candidate objects from the images IMG2 captured by the camera unit 122, extract object features OF2 of the candidate objects OBJ1 and OBJ5-OBJ9 from the images IMG2, and generate a local determination LD2 about whether each of the candidate objects OBJ1 and OBJ5-OBJ9 is fixed or not. An example of the object features OF2 and the local determination LD2 generated by the processor 124 is listed in the following Table 2:

TABLE 2

| | OF2 | | | LD2 |
|---|---|---|---|---|
| | color | size | shape | fixed or not |
| item1 (OBJ9) | white | 15 cm * 5 cm | rectangle | Y |
| item2 (OBJ5) | blue | 8 cm * 15 cm | concave cylinder | N |
| item3 (OBJ8) | green | 40 cm * 50 cm | rectangle | Y |
| item4 (OBJ6) | white | 30 cm * 30 cm | circle | Y |
| item5 (OBJ7) | khaki | 60 cm * 55 cm | vertical and horizontal planes with supporters | N |
| item6 (OBJ1) | red | 40 cm * 50 cm | rectangle | Y |

Figure 4C:
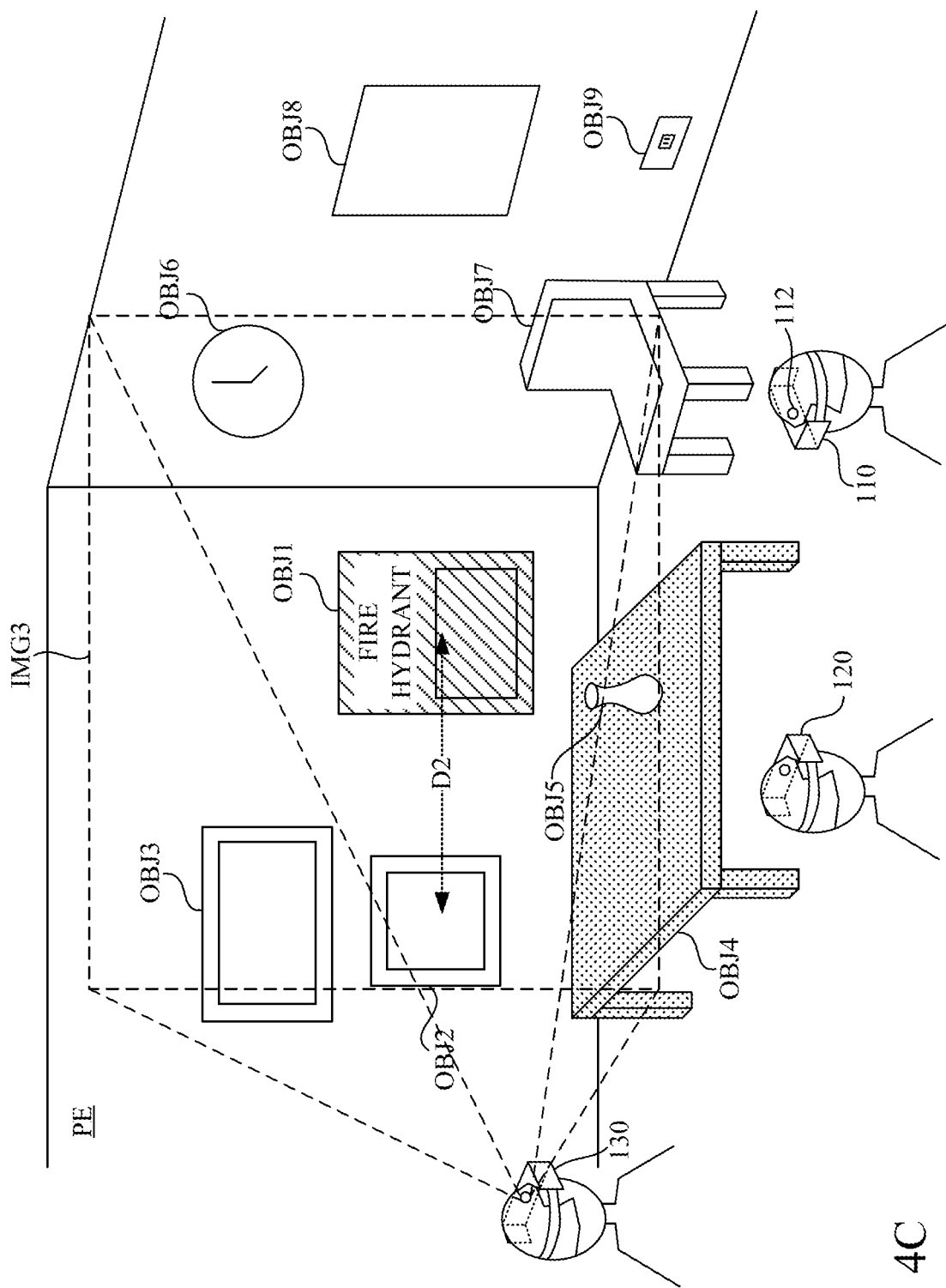

Reference is further made to FIG. 4C, which is a schematic diagram illustrating the head-mounted device 130 in the physical environment PE. In this embodiment shown in FIG. 4C, the images IMG3 covers another partial view of the physical environment PE. The image IMG3 covers candidate objects OBJ1, OBJ2, OBJ3, OBJ5 and OBJ6. Similarly, the processor 134 will extract candidate objects from the images IMG3 captured by the camera unit 132, extract object features OF3 of the candidate objects OBJ1-OBJ3 and OBJ5-OBJ6 from the images IMG3, and generate a local determination LD3 about whether each of the candidate objects OBJ1-OBJ3 and OBJ5-OBJ6 is fixed or not. An example of the object features OF3 and the local determination LD3 generated by the processor 134 is listed in the following Table 3:

TABLE 3

| | OF3 | | | LD3 |
|---|---|---|---|---|
| | color | size | shape | fixed or not |
| item1 (OBJ1) | red | 40 cm * 50 cm | rectangle | N |
| item2 (OBJ5) | blue | 8 cm * 15 cm | concave cylinder | N |
| item3 (OBJ3) | green | 40 cm * 50 cm | rectangle | Y |
| item4 (OBJ6) | white | 30 cm * 30 cm | circle | Y |
| item3 (OBJ2) | black | 30 cm * 30 cm | square | Y |

After the head-mounted device 110 receives the object features OF2 and the local determination LD2 from the head-mounted devices 120 and the receive object features OF3 and the local determination LD3 from the head-mounted devices 130, operation S360 is performed by the processor 114 of the head-mounted device 110 to generate an updated determination about whether each of the candidate objects is fixed or not according to the local determination LD1 and the local determinations LD2 and LD3 received from other head-mounted devices 120 and 130.

Based on aforesaid Table 1, Table 2 and Table 3, the updated determination on the head-mounted devices 110 can be generated by comparing the object features OF1 in Table 1 and the object features OF2 and OF3 in Table 2 and Table 3, so as to map a correspondence relationship between the items in different tables. In an embodiment, the head-mounted devices 110, 120, 130 generate Table 1, Table 2 and Table 3 individually, and the items in these tables are not necessary ranked in the same sequence. Therefore, the head-mounted device 110 refers the object features OF2 and OF3 in Table 2 and Table 3 to align the items from Table 2 and Table 3 to suitable items in Table 1. For example, the item6 in Table 2 having a color of red, a size of 40 cm*50 cm and a shape of rectangle matches to the item1 in Table 1 on the head-mounted device 110. In this case, the head-mounted device 110 will map the item6 in Table 2 to the item1 in Table 1, and combine the local determination LD2 about the item6 in Table 2 into a corresponding column in the updated determination on the head-mounted devices 110. The item1 in Table 3 also having a color of red, a size of 40 cm*50 cm and a shape of rectangle matches to the item1 in Table 1 on the head-mounted device 110. In this case, the head-mounted device 110 will map the item1 in Table 3 to the item1 in Table 1, and combine the local determination LD3 about the item1 in Table 3 into a corresponding column in the updated determination on the head-mounted devices 110.

Similarly, each of the items in Table 2 and Table 3 can be mapped toward items in Table 1 by processor 114. An example of the updated determination on the head-mounted devices 110 is listed in the following Table 4:

TABLE 4

| | OF1 | | | LD1 | LD2 | LD3 | UD |
|---|---|---|---|---|---|---|---|
| | color | size | shape | Fixed? | Fixed? | Fixed? | Fixed? |
| item1 (OBJ1) | red | 40 cm * 50 cm | rectangle | Y | Y | N | Y |
| item2 (OBJ4) | brown | 95 cm * 60 cm | horizontal plane with supporters | N | — | — | N |
| item3 (OBJ2) | black | 30 cm * 30 cm | square | Y | — | Y | Y |
| item4 (OBJ3) | yellow | 50 cm * 35 cm | rectangle | Y | — | Y | Y |
| item5 (OBJ5) | blue | 8 cm * 15 cm | concave cylinder | Y | N | N | N |
| item6 (OBJ6) | white | 30 cm * 30 cm | circle | — | Y | Y | Y |
| item7 (OBJ7) | khaki | 60 cm * 55 cm | . . . | — | N | — | N |
| . . . | . . . | . . . | . . . | . . . | . . . | . . . | . . . |

In an embodiment, if some items in Table 2 or Table 3 fail to find a match in existed items in Table 1, the head-mounted device 110 will merge the unmatched items from Table 2 and Table 3 into a new data column in Table 4. For example, the item6 and the item7 are not original items existed in Table 1.

As shown in Table 4, the item1 corresponding to the candidate object OBJ1 is an overlapping object found in Table 1, Table 2 and Table 3, such that the updated determination UD relative to the candidate object OBJ1 in Table 4 is decided by all of the local determinations LD1, LD2 and LD3. The candidate object OBJ1 is determined to be fixed in two of the local determinations LD1 and LD2, and determined to be not fixed in one local determination LD3. In this case, the updated determination UD will decide that the candidate object OBJ1 is fixed, because there are two head-mounted devices 110 and 120 of the opinion that the candidate object OBJ1 is fixed against one head-mounted device 130.

As shown in Table 4, the items corresponding to the candidate object OBJ5 is an overlapping object found in Table 1, Table 2 and Table 3, such that the updated determination UD relative to the candidate object OBJ5 in Table 4 is decided by all of the local determinations LD1, LD2 and LD3. The candidate object OBJ5 is determined to be not fixed in two of the local determinations LD2 and LD3, and determined to be fixed in one local determination LD1. In this case, the updated determination UD will decide that the candidate object OBJ1 is not fixed, because there are two head-mounted devices 120 and 130 of the opinion that the candidate object OBJ1 is not fixed against one head-mounted device 110.

As shown in Table 4, the item3 corresponding to the candidate object OBJ2 is an overlapping object found in Table 1 and Table 3, such that the updated determination UD relative to the candidate object OBJ2 in Table 4 is decided by the local determinations LD1 and LD3. The candidate object OBJ2 is determined to be fixed in two of the local determinations LD1 and LD3. In this case, the updated determination UD will decide that the candidate object OBJ2 is fixed.

As shown in Table 4, the item2 corresponding to the candidate object OBJ4 is a non-overlapping object found only in Table 1, such that the updated determination UD relative to the candidate object OBJ4 in Table 4 is decided by the local determination LD1. As shown in Table 4, the item7 corresponding to the candidate object OBJ7 is a non-overlapping object found only in Table 2, such that the updated determination UD relative to the candidate object OBJ7 in Table 4 is decided by the local determination LD2.

In aforesaid embodiment, the item6 and the item7 in Table 4 corresponding to the candidate object OBJ6 and OBJ7 are not in the field of view of the camera unit 112 of the head-mounted device 110. These item6 and the item7 corresponding to the candidate objects OBJ6 and OBJ7 are established according to information received from other head-mounted devices. However, the camera unit 112 of the head-mounted device 110 currently has no visions to these objects OBJ6 and OBJ7. As shown in FIG. 4A, the field of view of the camera unit 112 covers the candidate objects OBJ1-OBJ5. Based on the updated determination UD, the candidate objects OBJ1, OBJ2 and OBJ3 among the candidate objects OBJ1-OBJ5 are fixed. The candidate objects OBJ1-OBJ3 determined to be fixed in the updated determination UD are regarded as anchor points in the physical environment PE. The processor 114 is further configured to calculate relative distances between the head-mounted device 110 and each of the anchor points (OBJ1-OBJ3). Operation S370 in FIG. 3 are performed by the processor 114 to locate the head-mounted device 110 within the physical environment PE according to the relative distances between the head-mounted device 110 and the fixed objects (OBJ1-OBJ3).

Based on aforesaid embodiment, the object features OF1-OF3 observed by different head-mounted devices 110, 120 and 130 and the local determinations made by different head-mounted devices can be shared among the head-mounted devices 110, 120 and 130 within the physical environment PE. In this case, each of the head-mounted devices 110, 120 and 130 can acknowledge the opinion (about whether one object is fixed or not) from other head-mount devices located at different positions. The updated determination can be generated in accordance with all opinions observed from different positions, such that the correctness of the updated determination UD shall be higher than individual one of the local determination LD1, LD2 or LD3.

The head-mounted devices 120 and 130 can also perform corresponding operations similar to the embodiment shown in FIG. 3 to benefit from the updated determination UD and locate the head-mounted devices 120 and 130 within the physical environment PE.

Furthermore, the user wearing the head-mounted device 110 may rotating his/her head to different directions or move to different positions, such that the field of view of the head-mounted device 110 may change over time. In this case, if the user wearing the head-mounted device 110 rotating his head to the right side, the head-mounted device 110 will capture the image covering the candidate objects OBJ6 and OBJ7. Based on the updated determination UD shown in Table 4, the head-mounted device 110 may acknowledge that the candidate objects OBJ6 can be utilized as an anchor point and the candidate object OBJ7 is not suitable to be an anchor point. The head-mounted device 110 can compare object features of newly captured images with Table 4. Once the object features of newly captured images found the match items (corresponding to the candidate objects OBJ6 and OBJ7) in Table 4, the head-mounted device 110 is able decide whether the candidate objects OBJ6 and OBJ7 are fixed or not immediately. Therefore, the head-mounted device 110 is able to find new anchor point faster after the user rotating his/her head.

On the other hand, the object features OF1 of the candidate objects regarded as the anchor points in view of the camera unit 112 of the head-mounted device 110 can be transmitted from the head-mounted device 110 to another head-mounted device 120 or 130. The head-mounted device 120 or 130 is configured to recognize the anchor points in the physical environment PE once the anchor points appeared in view of the camera unit 122 or 132 of the head-mounted device 120 or 130.

In an embodiment as shown in FIG. 4A, the processor 114 of the head-mounted device 110 is configured to measure a relative distance D1 between a pair of the candidate objects OBJ1 and OBJ2. It is noticed that the relative distance D1 measured by the head-mounted device 110 may include a measurement error. For example, if the objects OBJ1 and OBJ2 gapped with a real distance of 50 cm in the physical environment PE, the relative distance D1 measured on the head-mounted device 110 may be 48 cm due to the measurement error. As shown in FIG. 4C, the pair of candidate objects OBJ1 and OBJ2 also covered by the images IMG3 captured by the head-mounted device 130. A relative distance D2 between the pair of the candidate objects OBJ1 and OBJ2 is measured by the head-mounted device 130 in view of the camera unit 132. The relative distance D2 measured by the head-mounted device 130 may also include another measurement error.

In this case, the head-mounted device 110 is able to receive the relative distance D2 measured in view of the head-mounted device 130 between the pair of the candidate objects OBJ1 and OBJ2. The head-mounted device 110 calculate an average relative distance between the pair of the candidate objects OBJ1 and OBJ2 according to the relative distance D1 and the relative distance D2 measured by two head-mounted device 130. For example, if the relative distance D2 measured on the head-mounted device 130 may be 49 cm due to the measurement error, the average relative distance will be 48.5 cm. For example, if the relative distance D2 measured on the head-mounted device 130 may be 52 cm due to the measurement error, the average relative distance will be 50 cm. By calculating an average of the relative distances measured among different head-mounted devices, the measurement error may be reduced.

Figure 5:
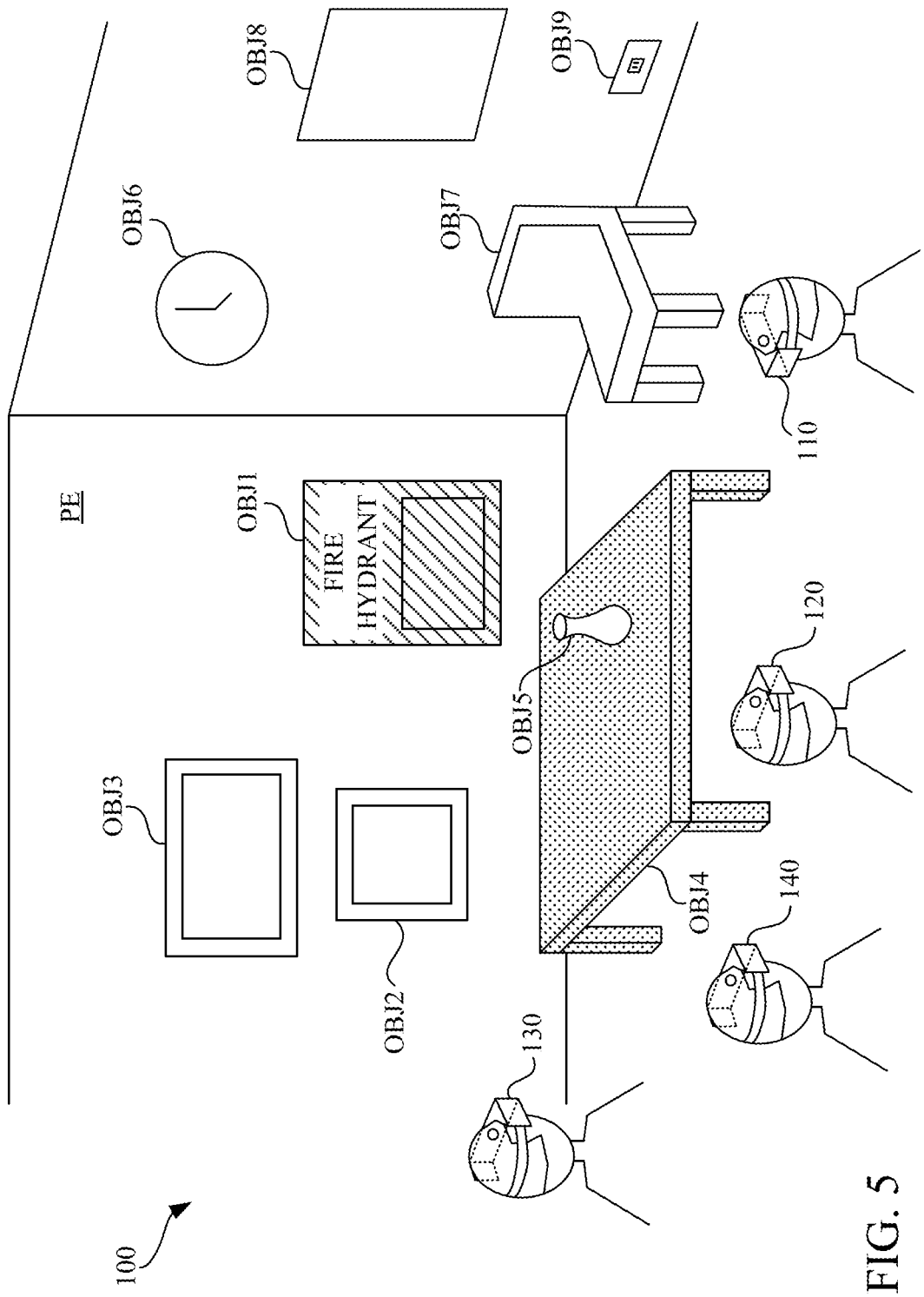
FIG. 5 is a schematic diagram illustrating a head-mounted device newly entered the physical environment in an embodiment of the disclosure.

Reference is further made to FIG. 5, which is a schematic diagram illustrating a head-mounted device 140 newly entered the physical environment PE in an embodiment of the disclosure. The object features OF1 of the candidate objects OBJ1-OBJ3 regarded as the anchor points are transmitted from the head-mounted device 110 to the head-mounted device 140 newly entered the physical environment PE. In this case, the head-mounted device 140 is configured to recognize the anchor points in the physical environment PE according to the object features OF1 of the candidate objects OBJ1-OBJ3 regarded as the anchor points. Similarly, the head-mounted device 140 may also receive the object features OF2/OF3 of the candidate objects regarded as the anchor points from the head-mounted devices 120 and 130. In this case, the head-mounted device 140 newly entered the physical environment PE will recognize valid anchor points easier and faster than observing the physical environment PE by itself.

In aforesaid embodiments of FIG. 1 to FIG. 4, the object features OF1-OF3 and the local determinations LD1-LD3 are shared among the head-mounted devices 110-130, each of the head-mounted devices is configured to generate the updated determination UD. However, the disclosure is not limited thereto.

Figure 6:
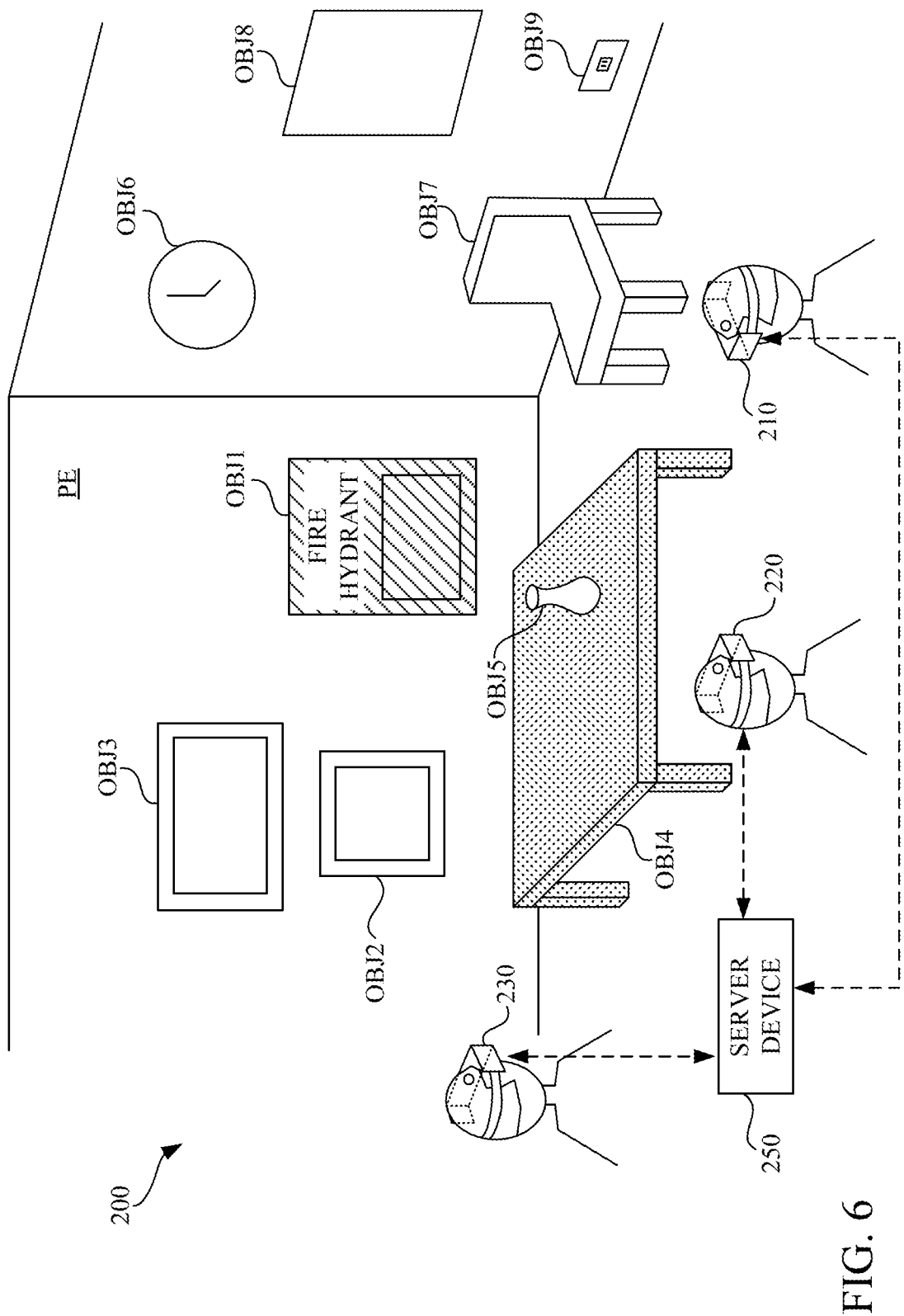
FIG. 6 is a schematic diagram illustrating a reality system according to another embodiment of the disclosure.
Figure 7:
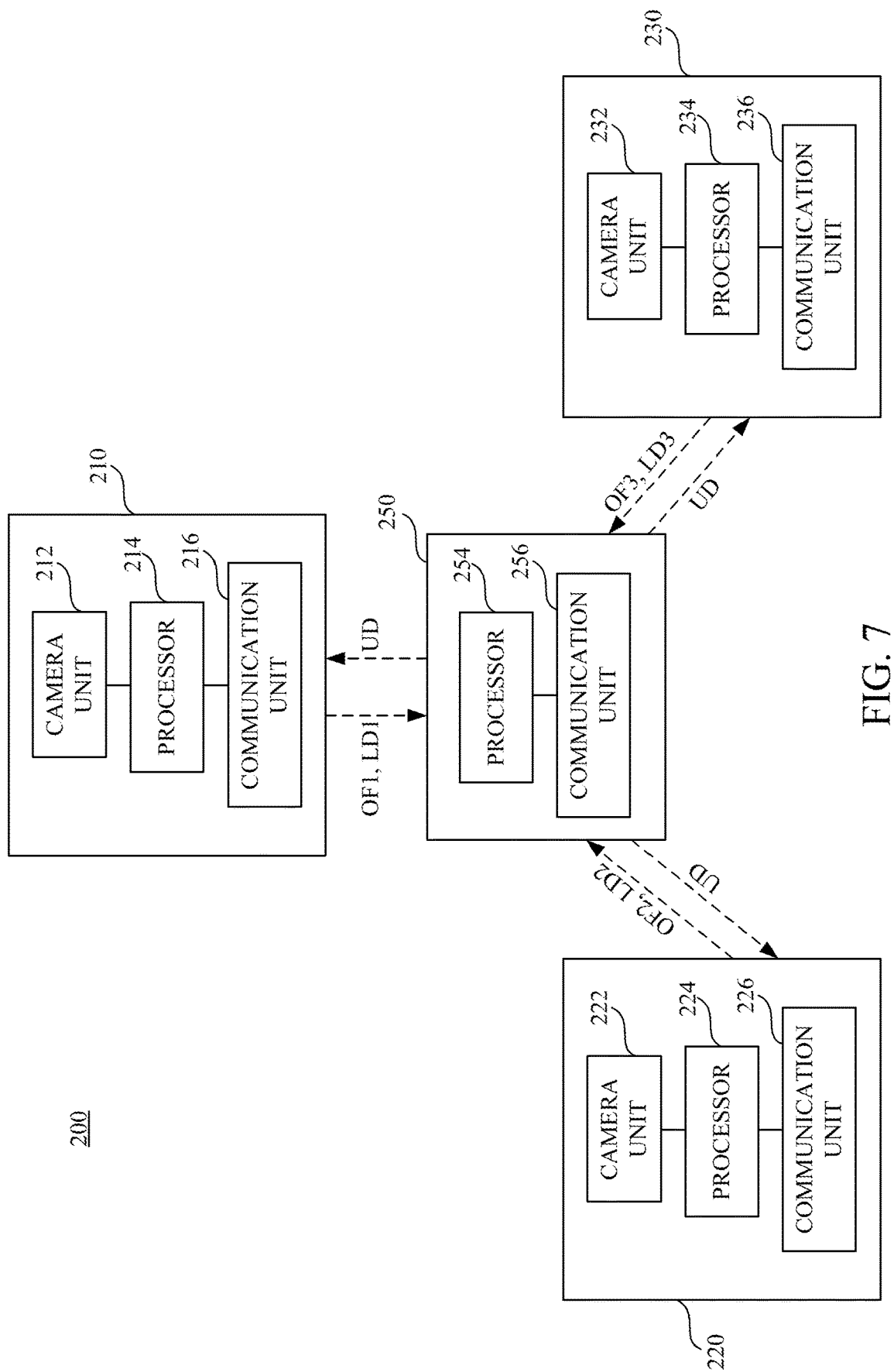
FIG. 7 is a functional block diagram illustrating the reality system in FIG. 6.

Reference is further made to FIG. 6 and FIG. 7. FIG. 6 is a schematic diagram illustrating a reality system 200 according to another embodiment of the disclosure. FIG. 7 is a functional block diagram illustrating the reality system 200 in FIG. 6. The reality system 200 in FIG. 6 and FIG. 7 include head-mounted devices 210, 220 and 230 and a server device 250. The head-mounted devices 210, 220 and 230 are located in a physical environment PE. As shown in FIG. 7, the head-mounted device 210 includes a camera unit 212, a processor 214 and a communication unit 216. The head-mounted device 220 includes a camera unit 222, a processor 224 and a communication unit 226. The head-mounted device 230 includes a camera unit 232, a processor 234 and a communication unit 236. Components of the head-mounted devices 210-230 are similar to the head-mounted device 110-130 in aforesaid embodiment shown in FIG. 2. The main difference between the reality system 200 in FIG. 6 and FIG. 7 and the reality system 100 in FIG. 1 and FIG. 2 is that, the reality system 200 further includes the server device 250. The server device 250 is communicated with the head-mounted devices 210, 220 and 230. The server device 250 includes a processor 254 and a communication unit 256. The communication unit 256 can include a WiFi transceiver, a WiFi-Direct transceiver, a Bluetooth transceiver, a BLE transceiver, a Zigbee transceiver and/or any equivalent wireless communication transceiver. The processor 254 is coupled to the communication unit 256. The processor 254 can be a central processing unit, a graphic processing unit and/or a control integrated circuit on the server device 250.

Figure 8:
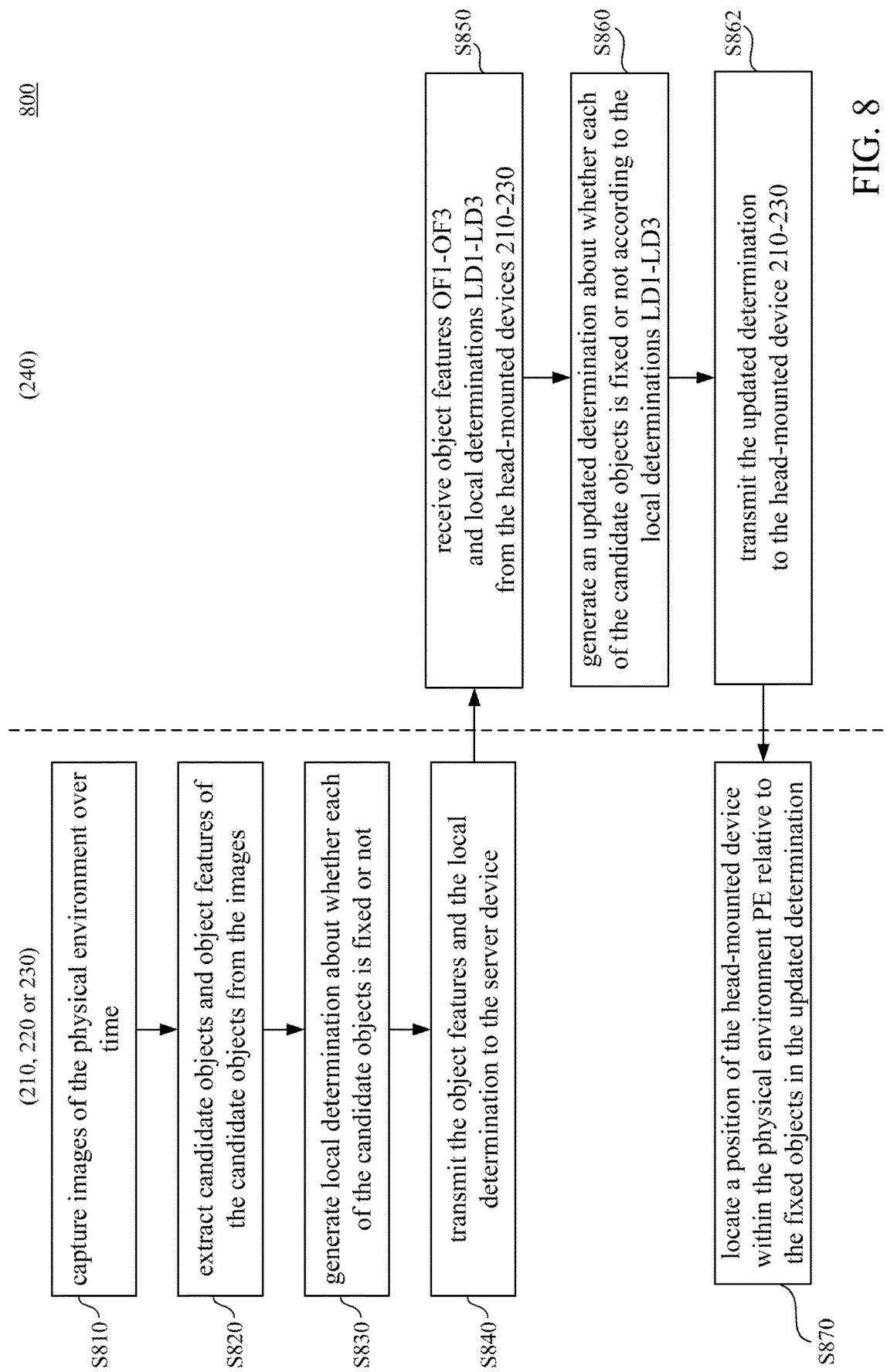
FIG. 8 is a flow diagram illustrating a control method suitable for the reality system in FIG. 6.

Reference is also made to FIG. 8, which is a flow diagram illustrating a control method 800, which is suitable to be utilized on the reality system 200 in FIG. 6 and FIG. 7.

Each of the head-mounted devices 210, 220 or 230 is configured to capture images of the physical environment PE by the camera unit 212, 222 or 232 respectively in operation S810 shown in FIG. 8. Each of the head-mounted devices 210, 220 or 230 is configured to extract candidate objects, extract object features OF1, OF2 or OF3 of the candidate objects in operation S820 shown in FIG. 8. Each of the head-mounted devices 210, 220 or 230 is configured to generate local determination LD1, LD2 or LD3 about whether each of the candidate objects is fixed or not in view of each of the head-mounted devices 210, 220 or 230 as operation S830 shown in FIG. 8. Features about capture images of the physical environment PE (S810) and how to extract object features OF1, OF2 or OF3 (S820) and generate local determinations LD1, LD2 or LD3 (S830) on the head-mounted devices 210, 220 or 230 are similar to operations S310, S320 and S330 disclosed in FIG. 3 and the head-mounted devices 110, 120 or 130 in previous embodiments shown in FIG. 1, FIG. 2 and FIG. 4A to FIG. 4C, and not repeated here.

In operation S840, each of the head-mounted devices 210, 220 or 230 is configured to transmit the object features OF1, OF2 or OF3 and the local determination LD1, LD2 or LD3 (referring to Table 1, Table 2 and Table 3 in aforesaid embodiments) to the server device 250.

The server device 250 is communicated with the head-mounted devices 210-230. The server device 250 is configured to collect the object features OF1-OF3 of the candidate objects and the local determinations LD1-LD3 from the head-mounted devices 210-230 in operation S850. The server device 250 is configured to generate an updated determination UD (referring to Table 4 in aforesaid embodiments) about whether each of the candidate objects is fixed or not according to the local determinations LD1-LD3 collected from the head-mounted devices 210-230. The server device 250 is configured to transmit the updated determination UD (referring to Table 4 in aforesaid embodiments) to each of the head-mounted devices 210-230, such that the head-mounted devices 210-230 can locate positions of the head-mounted devices 210-230 within the physical environment PE relative to the fixed objects (e.g. anchor points) in the updated determination UD.

In an embodiment, the server device 250 is configured to generate the updated determination by comparing the object features of the candidate objects in views of the head-mounted devices 210-230 to map a correspondence relationship between the candidate objects in views of the head-mounted devices 210-230. The server device 250 is configured to generate the updated determination UD corresponding to an overlapped object in view of the head-mounted devices according to the local determinations collected from the head-mounted devices. The server device 250 is configured to generate the updated determination UD corresponding to a non-overlapped object according to one of the local determinations LD1-LD3.

The object features OF1-OF3 includes at least one of colors, sizes and shapes of the candidate objects.

In an embodiment, the candidate objects determined to be fixed in the updated determination UD are regarded by the server device as anchor points in the physical environment PE. Each of the head-mounted devices 210-230 is further configured to calculate relative distances between the head-mounted devices 210-230 and each of the anchor points. Based on the relative distances, the processor 214, 224 or 234 is able to locate the head-mounted device 210, 220 or 230 within the physical environment PE.

In an embodiment, the object features of the candidate objects regarded as the anchor points are transmitted from the server device 250 to a new head-mounted device (not shown in FIG. 6 and FIG. 7) newly entered the physical environment PE. The new head-mounted device is configured to recognize the anchor points in the physical environment PE according to the object features of the candidate objects regarded as the anchor points.

In an embodiment, the object features of the candidate objects regarded as the anchor points are transmitted from the server device 250 to all of the head-mounted devices 210, 220 and 230. The head-mounted devices 210, 220 and 230 are further configured to measure local relative distances between a pair of the candidate objects. The server device 250 is configured to collect all of the local relative distances measured in view of the head-mounted devices 210-230 between the pair of the candidate objects. The server device 250 is configured to calculate an average relative distance of all of the local relative distances. Each of the head-mounted devices 210, 220 and 230 are further configured to obtain local measurement errors by comparing the local relative distances and the average relative distance.

Based on aforesaid embodiment, the object features OF1-OF3 observed by different head-mounted devices 210, 220 and 230 and the local determinations LD1-LD3 made by different head-mounted devices can be collected by the server device 250. The server device 250 can generate the updated determination UD in accordance with aforesaid information collected from different head-mounted devices 210, 220 and 230. The updated determination UD can be generated in accordance with all opinions observed from different positions, such that the correctness of the updated determination UD shall be higher than individual one of the local determination LD1, LD2 or LD3.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reality system, comprising:
   a first head-mounted device located in a physical environment, the first head-mounted device comprising:
      a camera unit configured for capturing a plurality of images of the physical environment over time;
      a communication unit configured for communicating with a plurality of second head-mounted devices;
      a processor coupled to the camera unit and the communication unit, the processor being configured to:

extract a plurality of first candidate objects and a plurality of first object features of the first candidate objects from the images captured by the camera unit;

generate a first local determination about whether each of the first candidate objects is fixed or not;

transmit the first object features and the first local determination to the second head-mounted devices;

receive second object features of a plurality of second candidate objects and second local determinations about whether each of the second candidate objects is fixed or not from the second head-mounted devices;

comparing the first object features and the second object features to map a correspondence relationship between the first candidate objects and the second candidate objects to determine an overlapped object found in the first candidate objects and the second candidate objects; and generate an updated determination about whether each of the first candidate objects is fixed or not according to the first local determination and the second local determinations, wherein the overlapped object is determined to be fixed if a number of the first local determinations and the second local determinations corresponding to the overlapped object determined to be fixed is greater than a number of the first local determinations and the second local determinations corresponding to the overlapped object determined to be not fixed, wherein the overlapped object is determined to be not fixed if the number of the first local determinations and the second local determinations corresponding to the overlapped object determined to be fixed is smaller than the number of the first local determinations and the second local determinations corresponding to the overlapped object determined to be not fixed.

2. The reality system of claim 1, wherein the processor is further configured to generate the updated determination by:

generating the updated determination corresponding to a non-overlapped object found in one of the first candidate objects or one of the second candidate objects according to the first local determination or the second local determination.

3. The reality system of claim 1, wherein the first object features comprise at least one of colors, sizes and shapes of the first candidate objects, the second object features comprise at least one of colors, sizes and shapes of the second candidate objects.

4. The reality system of claim 1, wherein the first candidate objects determined to be fixed in the updated determination are regarded as anchor points in the physical environment, the processor is further configured to calculate relative distances between the first head-mounted device and each of the anchor points, and locate the first head-mounted device within the physical environment according to the relative distances.

5. The reality system of claim 4, wherein the first object features of the first candidate objects regarded as the anchor points are transmitted from the first head-mounted device to a third head-mounted device newly entered the physical environment, the third head-mounted device is configured to recognize the anchor points in the physical environment according to the first object features of the first candidate objects regarded as the anchor points.

6. The reality system of claim 4, wherein the first object features of the first candidate objects regarded as the anchor points in view of the camera unit of the first head-mounted device are transmitted from the first head-mounted device to the second head-mounted devices, the second head-mounted devices are configured to recognize the anchor points in the physical environment once the anchor points appeared in view of camera units of the second head-mounted devices.

7. The reality system of claim 1, wherein the processor is further configured to:

measure a first relative distance between a pair of the first candidate objects;

receive a second relative distance measured in view of one of the second head-mounted devices between a pair of the second candidate objects corresponding to the pair of the first candidate objects; and calculate an average relative distance between the pair of the first candidate objects according to the first relative distance and the second relative distance.

8. The reality system of claim 7, wherein the processor is further configured to obtain a measurement error by comparing the first relative distance and the average relative distance.

9. A control method, suitable for a plurality of head-mounted devices located in a physical environment, the control method comprising:

capturing a plurality of images of the physical environment over time by the head-mounted devices, wherein the head-mounted devices comprise a first head-mounted device and a second head-mounted device;

extracting a plurality of candidate objects and a plurality of object features of the candidate objects from the images, the candidate objects comprise first candidate objects and second candidate objects, the object features comprise first object features of the first candidate objects and second object features of the second candidate objects, the first candidate objects and the first object features are extracted by the first head-mounted device, and the second candidate objects and the second object features are extracted by the second head-mounted device;

generating a plurality of local determinations about whether each of the candidate objects is fixed or not over time, wherein the local determinations comprise first local determinations generated by the first head-mounted device and second local determinations generated by the second head-mounted device;

sharing the object features and the local determinations between the head-mounted devices;

comparing the first object features and the second object features to map a correspondence relationship between the first candidate objects and the second candidate objects to determine an overlapped object found in the first candidate objects and the second candidate objects; and generating an updated determination about whether each of the candidate objects is fixed or not according to the local determinations shared between the head-mounted devices, wherein the overlapped object is determined to be fixed if a number of the first local determinations and the second local determinations corresponding to the overlapped object determined to be fixed is greater than a number of the first local determinations and the second local determinations corresponding to the overlapped object determined to be not fixed, and the overlapped object is determined to be not fixed if the number of the first local determinations and the second local determinations corresponding to the overlapped object determined to be fixed is smaller than the number of the first local determinations and the second local determinations corresponding to the overlapped object determined to be not fixed.

10. The control method of claim 9, further comprising:
locating a plurality of positions of the head-mounted devices within the physical environment relative to the candidate objects determined to be fixed in the updated determination.

* * * * *